United States Patent
Khan et al.

(10) Patent No.: US 8,660,533 B2
(45) Date of Patent: Feb. 25, 2014

(54) SYSTEM, METHOD AND APPARATUS FOR PAIRING SIM OR UICC CARDS WITH AUTHORIZED WIRELESS DEVICES

(75) Inventors: Shoaib S. Khan, Miami, FL (US); Khurram Humayun Chawdhry, Miami, FL (US); Ovidio Mejia, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 13/409,720

(22) Filed: Mar. 1, 2012

(65) Prior Publication Data

US 2012/0264400 A1    Oct. 18, 2012

Related U.S. Application Data

(60) Provisional application No. 61/448,002, filed on Mar. 1, 2011.

(51) Int. Cl.
*H04M 1/66*  (2006.01)

(52) U.S. Cl.
USPC ........ 455/411; 455/410; 455/458; 455/432.3; 455/435.1; 455/435.2

(58) Field of Classification Search
USPC ......... 455/558, 411, 410, 432.3, 435.1, 435.2
See application file for complete search history.

(56) References Cited

U.S. PATENT DOCUMENTS

| | | | |
|---|---|---|---|
| 6,124,799 A | 9/2000 | Parker | |
| 6,138,005 A | 10/2000 | Park | |
| 6,463,300 B1 | 10/2002 | Oshima | |
| 6,504,932 B1 | 1/2003 | Vasnier et al. | |
| 7,054,613 B2 | 5/2006 | Smeets | |
| 7,137,003 B2 | 11/2006 | Krishnan et al. | |
| 7,286,852 B2 | 10/2007 | Imura | |
| 7,318,159 B2 | 1/2008 | Salmivalli | |
| 7,366,542 B2 | 4/2008 | Schmidt | |
| 7,873,382 B2 | 1/2011 | Rydgren et al. | |
| 2002/0147926 A1* | 10/2002 | Pecen et al. ................... | 713/201 |
| 2004/0015692 A1 | 1/2004 | Green et al. | |
| 2004/0157584 A1 | 8/2004 | Bensimon et al. | |
| 2005/0149740 A1 | 7/2005 | Kotzin et al. | |
| 2007/0032227 A1* | 2/2007 | Chen ............................ | 455/418 |
| 2008/0200147 A1 | 8/2008 | Nylander et al. | |
| 2009/0253406 A1 | 10/2009 | Fitzgerald et al. | |
| 2009/0270126 A1 | 10/2009 | Liu | |
| 2010/0192207 A1* | 7/2010 | Raleigh ............................. | 726/6 |
| 2011/0034211 A1 | 2/2011 | Li | |
| 2011/0077051 A1* | 3/2011 | Brown et al. ................. | 455/558 |
| 2011/0081950 A1* | 4/2011 | Guven ......................... | 455/558 |

\* cited by examiner

*Primary Examiner* — Khalid Shaheed
(74) *Attorney, Agent, or Firm* — Baker & Hostetler LLP (57) ABSTRACT

A wireless device and a process of authorizing a wireless device are disclosed. The process includes storing a list of authorized terminals within a memory accessible by a wireless device. The process further includes comparing the list of authorized terminals in the memory to at least one of terminal profile data and an IMEI of the wireless device and allowing network access if at least one of the terminal profile data and the IMEI are found on the list of authorized terminals and limiting network access if at least one of the terminal profile data and the IMEI are not found on the list of authorized terminals.

20 Claims, 4 Drawing Sheets

Table I

| Variant Number | TPD Verification Switch | IMEI Locking Switch | Reporting SMS Switch | OTA Provisioning Switch |
|---|---|---|---|---|
| 1 | On | On | On | Off |
| 2 | On | Off | On | Off |
| 3 | Off | On | On | Off |
| 4 | Off | Off | On | Off |
| 5 | Off | Off | Off | Off |
| 6 | Off | Off | On | On |
| 7 | On | On | On | On |

FIGURE 4

SYSTEM, METHOD AND APPARATUS FOR PAIRING SIM OR UICC CARDS WITH AUTHORIZED WIRELESS DEVICES

CROSS REFERENCE TO PRIOR APPLICATIONS

This application claims the benefit of U.S. Provisional Application No. 61/448,002 filed on Mar. 1, 2011, which is hereby incorporated by reference in its entirety for all purposes as if fully set forth herein.

BACKGROUND OF THE DISCLOSURE

1. Field of the Disclosure

This disclosure relates generally to a system, method and apparatus for pairing postpaid SIM or UICC cards with authorized wireless devices. More specifically, this disclosure relates to a system, method and apparatus for pairing postpaid SIM or UICC cards with authorized wireless devices in order to restrict usage of the postpaid SIM or UICC cards to certain devices.

2. Related Art

Certain companies that provide postpaid wireless services, such as mobile phone service, can be wireless carriers that maintain and control their own wireless networks, where carriers rely heavily on backend systems to address any provisional, billing, security and data issues that might threaten the health of their networks. Wireless carriers also typically offer multi-tiered postpaid offerings which allow their subscriber's unrestricted access to their network by progressively charging or taxing them based on their network usage based on data usage and airtime usage.

A Mobile Virtual Network Operator (MVNO) is a mobile operator that typically does not own its own frequency spectrum and typically does not have its own network infrastructure. Instead, MVNOs have business arrangements and contracts with wireless carriers to purchase usage of their networks (e.g., minutes of use, volume of data transfer, number of SMS messages, etc.) that the MVNOs in turn sell to their own subscribers. Based on these business arrangements and contracts, carriers and MVNOs have established detailed Terms of Service (TOS) and conditions for their subscribers. As such, if a subscriber is found in violation of these conditions they are typically given a warning, they have their subscription/service terminated or the like.

In today's MVNO prepaid marketplace, the prepaid phones that implement identification devices such as a subscriber identity module or a subscriber identification module (SIM) cards or Universal Integrated Circuit Cards (UICC) are strictly regulated in order to keep costs low and prepaid phone/rate offerings attractive. In an effort to diversify their revenue portfolio, MVNOs are now looking towards the postpaid market as a means to diversify their revenue portfolio but face a number of challenges based on the fact that: (1) MVNOs do not operate and control their own wireless networks and thus do not have the same ability as the carriers to implement provisional, billing, security and data controls on the backend to control network usage; and (2) MVNOs and, in turn, their subscribers are bound by the terms of services and conditions of the MVNO's business arrangements and contracts with the carriers associated with purchased network usage. In order for MVNOs to provide a comparable postpaid experience for its customers as provided for by the carriers, there is a need for MVNOs to provide customers with enough freedom of choice while still regulating the customers' usage of the network. To be competitive with carriers, MVNOs further need to provide attractive postpaid offerings to its customers while still keeping costs low enough to turn a profit based on the contractual obligations the MVNOs have with the carriers. For example, if MVNO customers exceed the collective network usage that has been contracted for by a MVNO, the MVNO is typically heavily charged or penalized.

The solutions for controlling and charging customers typically implemented by carriers do not mitigate the risks enough from the perspective of MVNOs whose business model is quite different of that of network carriers. Furthermore, the network solution implemented by carriers is extensive and complex, thus making it a slow solution to integrate. Additionally, it is also expensive in its implementation and expansive in its affects since this encompasses everyone on the network. Yet another shortcoming of the existing network solution is that it is easier for a carrier to absorb the cost of network traffic generated by its subscribers (violators of TOS) as they own the network versus MVNOs who have to pay exorbitant out of pocket fees for violations of its TOS with the carrier. Moreover, to date, MVNOs have no meaningful way to prevent TOS violators which can have a significant impact on their rate/phone offerings. For example, conventional postpaid SIM and UICC cards on the Global System for Mobile Communication (GSM) network are now unlocked (or can be unlocked) and can be moved between mobile phones without restriction, which can be particularly troublesome for MVNOs that only want their subscribers to use certain devices that have certain offerings.

Accordingly, there is a need for a Mobile Virtual Network Operator to be able to provide subscribers with the ability to have greater choice of services and devices while allowing the Mobile Virtual Network Operator the ability to limit the choice of services and devices.

SUMMARY OF THE INVENTION

Aspects of the invention advantageously provide a process of authorizing a wireless device including storing a list of authorized terminals within a memory accessible by a wireless device, comparing the list of authorized terminals in the memory to at least one of terminal profile data and an IMEI of the wireless device, and allowing network access if at least one of the terminal profile data and the IMEI are found on the list of authorized terminals and limiting network access if the terminal profile data and the IMEI are not found on the list of authorized terminals.

The memory may include a removable memory associated with the wireless device. The removable memory may include at least one of a Subscriber Identity Module (SIM) and Universal Integrated Circuit Card (UICC). The list of authorized terminals may include at least one of a previously stored International Mobile Equipment Identity (IMEI) and a listing of authorized terminal profile data values. The process may include sending a report comprising at least one of a current Terminal Profile Data, last accepted International Mobile Equipment Identity (IMEI), a current IMEI, and an Universal Integrated Circuit Card (UICC) Integrated Circuit Card ID (ICC-ID) to a backend server. The process may include storing securely in the removable memory at least one of a current Terminal Profile Data, last accepted International Mobile Equipment Identity (IMEI), a current IMEI, and an UICC Integrated Circuit Card ID (ICC-ID). The process may include at least one of provisioning and updating Over The Air (OTA) at least one of switches of an authorizing application and the list of authorized terminals. The network may include at least one of a Global System for Mobile Communication (GSM) network and a UMTS/LTE telecommunication network. The process may include functioning in at least one of a Global System for Mobile Communication (GSM) network and a UMTS/LTE telecommunication network as a Mobile Virtual Network Operator (MVNO) comprising using the process of authorizing a wireless device above.

Further aspects of the invention advantageously provide a wireless device configured to control network authorization including a removable memory storing a list of authorized terminals within the wireless device, a comparator to compare the list of authorized terminals in the removable memory to at least one of terminal profile data and an IMEI of the wireless device, and the wireless device being configured to allow network access if at least one the terminal profile data and the IMEI of the wireless device is found on the list of authorized terminals and the wireless device being further configured to limit network access if the terminal profile data and the IMEI of the wireless device is not found on the list of authorized terminals.

The removable memory may include at least one of a Subscriber Identity Module (SIM) and Universal Integrated Circuit Card (UICC). The list of authorized terminals may include at least one of a previously stored International Mobile Equipment Identity (IMEI) and a listing of authorized terminal profiles. The wireless device may be configured to send a report comprising at least one of the current Terminal Profile Data, last accepted International Mobile Equipment Identity (IMEI), the current IMEI, and an Universal Integrated Circuit Card (UICC) Integrated Circuit Card ID (ICC-ID) to a backend server. The wireless device may include storing securely in the memory at least one of the current Terminal Profile Data, last accepted International Mobile Equipment Identity (IMEI), the current IMEI, and a Universal Integrated Circuit Card (UICC) Integrated Circuit Card ID (ICC-ID). The wireless device may be configured to provision an application authorizing a wireless device using one of an Over The Air (OTA) process and a non-OTA process.

In one or more aspects, a system, apparatus and method are provided for pairing postpaid SIM or UICC cards with authorized wireless devices in order to restrict usage of the postpaid SIM or UICC cards to certain authorized wireless devices.

In one or more aspects, a SIM or UICC pairing software application installed on or associated with a SIM or UICC card is provided that only allows usage of the SIM or UICC card with certain authorized wireless devices in order to restrict usage of the SIM or UICC card to such authorized wireless devices. This allows the MVNO (or a wireless carrier) to control the particular wireless devices that are able to connect to a wireless network without fundamentally requiring any modifications to the wireless devices themselves, where such network access controls are implemented by the SIM or UICC pairing application that only pairs or marries the SIM or UICC card with certain authorized wireless devices. The SIM or UICC pairing application also prevents a user or subscriber of wireless service from accessing the network by removing their SIM or UICC card from an authorized wireless device and inserting the SIM or UICC card into another device that is not authorized, since the SIM or UICC pairing application would cause wireless service to be limited when the SIM or UICC card is inserted into an unauthorized device in this manner. This limits users or subscribers to accessing the wireless network from only authorized wireless devices.

In one or more aspects, postpaid SIM or UICC cards (e.g., GSM/UMTS/LTE SIM cards and UICC cards) are paired to wireless handsets appearing on an approved or authorized list of wireless devices in a new and creative way, where the wireless devices appearing on the approved list can be chosen by the MVNO, carrier or another trusted source. This way of securing the SIM or UICC card will ensure to the best of its ability that only those wireless devices offered (approved) by a particular MVNO/carrier will be able to access a wireless network. This solution is advantageous in that it does not require any fundamental modification of the wireless device in order to restrict their access to particular networks, thereby making the solution forwards and backwards compatible with all compatible wireless devices.

In one or more aspects, the postpaid SIM or UICC cards can be configured to possess a reporting feature that will transmit critical information about the SIM or UICC card/wireless device over the network to a backend server, system, or component operated by the carrier/MVNO for appropriate action, if deemed necessary, in a real-time manner. One benefit of this solution is that it helps carriers and MVNOs keep unauthorized, rogue wireless handsets and devices from accessing limited network resources, thereby helping in reducing unwanted traffic and associated costs. Another benefit of this solution is that MVNOs will have more control over what equipment (i.e., wireless handset) is used on a carrier's network without needing to have the same level of access to network and backend resources as the carrier themselves. For instance, this solution can help in differentiating between those subscribers that violate the terms of service (TOS) versus those that are simply using unapproved devices. For example, a subscriber may have TOS that prevent the subscriber from performing certain actions (e.g., tethering, Internet browsing, etc.), where the subscriber may have been provided a wireless device that is configured consistent with such TOS (e.g., it may not have the capability to perform tethering, Internet browsing, etc.). If the subscriber were to remove the SIM or UICC card and reinstall it into another authorized wireless device that possessed different capabilities and use thereof would violate the subscriber's TOS, the reporting feature of the SIM or UICC card can allow the MVNO (or carrier) to monitor whether a particular subscriber is performing actions that are inconsistent with their TOS and allow the MVNO (or carrier) to disable or otherwise restrict functionality of the SIM or UICC card and, in turn, restrict access to the network.

As a specific example, a MVNO may have a basic metric that identifies a user violation of terms of service (TOS) for some plans as whether such users exceed a particular data usage. Once the user hits that level, the MVNO will typically shutdown the device, whether through the system or by making such requests to the carriers. While the particular data usage does offer a metric, there are costs with data usage. While an MVNO has typically controlled such usage with device selection, the invention has become additionally applicable and more critical with unlocked SIMs or UICCs to be used with third-party devices.

Yet another benefit of this solution is that it can operate in 2G, 3G, 3.5G, 4G and subsequent generations of environments. It is backwards and forwards compatible with appropriate enhancements. In addition, this solution offers enhanced flexibility where the SIM or UICC card itself would also have the capability of being preloaded with the SIM or UICC pairing application or having the SIM or UICC pairing application updated OTA (over the air) if required with various possible rules and policies. Lastly, this solution is simple, cost effective and flexible to the needs of both carriers and MVNOs which will inevitability lead to more competitive post-paid offerings. It is important to note that this solution could also have other practical applications for small businesses, government entities, private organizations, parents, etc. who would want to take advantage of managing and tracking a subscriber in various ways.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

In the description that follows, the inventions may be described in reference to one or more aspects for the authorized use of SIM or UICC cards in verified wireless devices. The inventions, however, are not limited to any particular application nor is it limited by the examples described below. Various modifications to the disclosed aspects may be apparent to those skilled in the art and the general principles defined herein may be applied to other aspects and applications without departing from the spirit and scope of the inventions. Therefore, the description of the aspects that follow are for purposes of illustration and not limitation. In particular, the invention may be implemented with SIM cards, UICC cards, and any equivalent. However, the description will describe an implementation for a SIM card only for brevity.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Reference in this specification to a "wireless device" is intended to encompass any compatible mobile technology computing device that connects to a wireless communication network and utilizes a UICC, SIM card, or the like, such as mobile phones, mobile equipment, mobile stations, user equipment, cellular phones, smartphones or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network from which a MVNO contracts with a wireless carrier to provide mobile phone services through the use of a wireless device having a SIM card installed therein, such as the Global System for Mobile Communication (GSM) network. However, other cellular wireless communication protocols, such as CDMA or the like, may utilize the teachings of the present application to the extent such other cellular wireless communication protocols are modified to utilize a replaceable memory or the like that can be installed in a wireless device to allow a wireless device to connect to a wireless network.

In one or more aspects, a system, apparatus and method are provided for pairing postpaid SIM cards with authorized wireless devices in order to track and/or restrict usage of the postpaid SIM cards to certain authorized wireless devices. In one or more aspects, a postpaid SIM pairing application (PSP) is installed on, operates on, and/or is associated with a postpaid SIM card to provide the functionality of the various aspects described herein. Of course, the PSP application may be installed on, operate on, and/or associated with other aspects of the invention.

Figure 1:
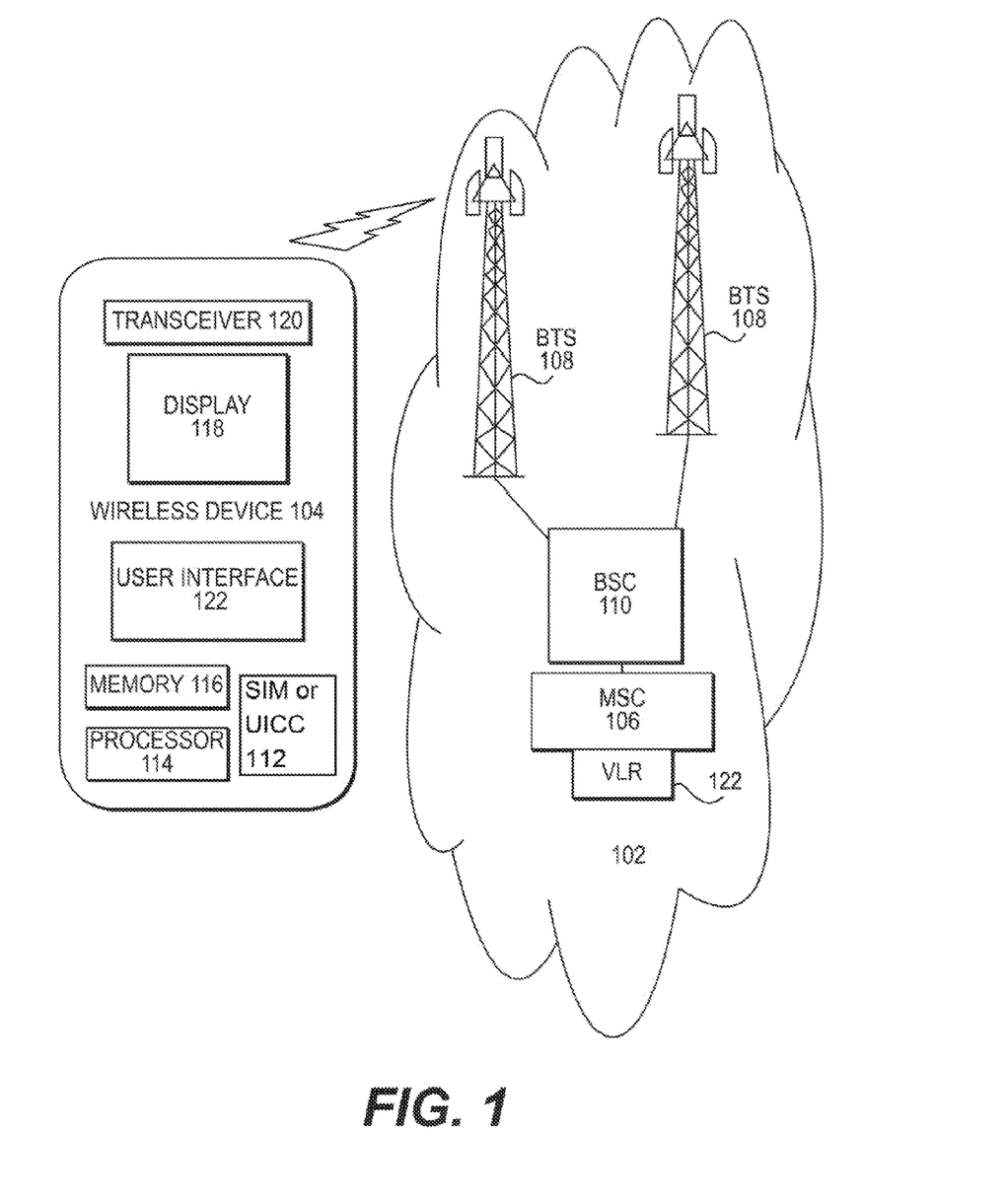
FIG. 1 shows wireless device and a GSM network in accordance with aspects of the invention.

The following acronyms used herein will be defined as follows:

APPD—Authorized PostPaid Device (as authorized by the MVNO)
BSC—Base Station Controller
BTS—Base Transceiver Station
GSM—Global System for Mobile Communication
HLR—Home Location Register
ICCID—Integrated Circuit Card ID
IMEI—International Mobile Equipment Identity
IMSI—International Mobile Subscriber Identity
Ki—Authentication Key
LAI—Local Area Identity
LTE—Long Term Evolution
MSC—Mobile services Switching Center
MVNO—Mobile Virtual Network Operator
NACC—Network ACCess (allowing 2G/3G/3.5G network authentication, reading from and writing to EF-Kc and EF-LOCI, EF-KcGPRS, EF-LOCI GPRS (EF_PSLOCI), EF-Keys, EFPSKeys and reading from EF-IMSI)
OTA—Over-The-Air
PLMN—Public Land Mobile Network
PP—PostPaid
PSP—PostPaid SIM Pairing (Application)
SIM—Subscriber Identity Module or UICC
SMS—Short Message Service
TOS—Terms Of Service
TPD—Terminal Profile Data
UICC—Universal Integrated Circuit Card or SIM
UMTS—Universal Mobile Telecommunications Service
VLR—Visitor Location Register FIG. 1 shows a wireless device and a GSM network in accordance with aspects of the invention. In particular, FIG. 1 shows a user handset or wireless device 104. The wireless device 104 provides the radio and signal processing needed to access a GSM network 102 for services. The wireless device 104 includes a processor 114, memory 116, display 118, transceiver 120, user interface 122, and the like as is known in the art. The processor is configured to process call functions, provide other services to the user, and may also execute any programs including the PSP application. It should be noted that the PSP application may also execute on a subscriber identification module (SIM) or on dedicated hardware including semiconductors, application specific integrated circuits (ASIC), programmable logic arrays, and other hardware devices. The PSP application may also execute partially or completely on the network 102 and/or any other network including any form of cloud computing and the like.

A subscriber identity module or subscriber identification module (SIM) 112 is associated with the wireless device 104. The SIM 112 is an integrated circuit that stores an International Mobile Subscriber Identity (IMSI) and also stores a key used to identify and authenticate subscribers on the wireless device 104 and other devices. The SIM 112 may be configured to be transferred between different wireless devices. SIM 112 may also store network-specific information used to authenticate and identify subscribers on the network 102. The network-specific information may include the ICCID, Authentication Key (Ki), Local Area Identity (LAI), Operator-Specific Emergency Number, and so on.

The SIM 112 (or UICC) may allow full/limited Network ACCess (NACC) by default. In one aspect, Network ACCess may include allowing 2G3G/3.5G/4G LTE network authentication, reading from and writing to one or more of the following elementary files: EF-Kc, EF-LOCI, EF-KcGPRS, EF-LOCI GPRS, EF_PSLOCI, EF-Keys, and EFPSKeys and reading from EF-IMSI. The PSP application is configured to ensure to the best extent possible that the MVNO (or carrier) subscription is used in only APPD devices. Also, the PSP application may also be configured to track and report device changes occurring with GSM subscriptions.

FIG. 1 further shows that the GSM network 102 may include a Mobile services Switching Center (MSC) 106 that may perform the switching of calls and that may include a Visitor Location Register (VLR). The GSM network 102 may also include a Base Transceiver Station (BTS) 108 and a Base Station Controller (BSC) 110. The Base Transceiver Station 108 houses the radio transceivers that define a cell and handle the radio-link protocols with the wireless device 104. The Base Station Controller 110 manages the radio resources for one or more BTSs 108. The BSC 110 is the connection between the wireless device 104 and the Mobile service Switching Center (MSC) 106.

A Home Location Register (HLR (not shown)) and the VLR together with the MSC 106, provide the call-routing and roaming capabilities. The HLR contains all the administrative information of each subscriber registered in the corresponding GSM network 102, along with the current location of the wireless device 104.

Detailed Description of PSP Application

In one or more aspects, the PSP application may have four secure switches. As referred to herein, the term "switch" can refer to configurable, logical flags internally stored within the SIM application domain. Of course the PSP application may have more or less switches as needed. The switches may include one switch for terminal profile validation, one switch for IMEI locking, one switch for OTA provisioning, and one switch for sending SMS reporting messages to a backend server, system, or component and to toggle between a specific validation/reporting to process and not to process.

During a power-up on the wireless device 104, the PSP application may perform validation and/or a reporting process based on the switch settings. The switches may be updated via a secure non-OTA programming method or may be updated using an OTA programming method. In one or more aspects, the PSP application may include any combination of these secure switches activated at any given time, may include only a portion of these secure switches or may include further switches for validation, reporting, and the like. Additionally, the invention contemplates any aspect that provides similar functionality of the switches.

In one or more aspects, the PSP application may include OTA programming functionality in case the PSP application needs to be updated via OTA programming. Furthermore, when provided, OTA based provisioning and updating may be secure with a specific access domain created for the MVNO based on the PSP application.

In one or more aspects, the PSP Application may include the following switches:

First Switch—Terminal Profile Validation

The first switch may analyze terminal profile data (TPD) in the wireless device 104 and match it against a listing stored on the SIM 112 for validation. Upon power-up, the PSP application may receive the identifying information about the wireless device 104, such as its TPD, from the wireless device 104 and compare this identifying information partially or completely against a listing of authorized terminal profile listings. The terminal profile listings may be stored on the SIM 112. If the terminal profile listing matches the TPD, the wireless device 104 may be authorized for continued use of the wireless network 102. In one or more aspects, the TPD may include the International Mobile Equipment Identity (IMEI) or other identifying information of the wireless device 104.

Second Switch—Pairing to Specific Wireless Device

The SIM 112 may be originally paired or married to a specific wireless device 104. In this regard, the original IMEI of the wireless device 104 may be stored securely in the SIM 112 or in the PSP application upon initial power-up. Upon subsequent power-ups of the wireless device 104, the PSP application may verify that it is still installed in an authorized wireless device 104 by checking the IMEI presently retrieved with the originally paired IMEI for continued use of the wireless network.

Third Switch—SIM Reports Activity to Backend Server

The PSP application may also be configured to send activity reports, such as by SMS messages (e.g., text SMS, binary SMS, or the like), to a backend server, system, or component controlled by the MVNO or wireless carrier for additional validation or monitoring by the backend server, system, or component. For example, whenever there has been a detected IMEI change when a SIM 112 has been installed into a new wireless device 104 associated with the new IMEI, this information may be transmitted by the PSP application to the backend server, system, or component for validation and/or monitoring. These reports can also include activity of the wireless device 104 to ensure that a particular subscriber is only using those services that are allowed under their Terms of Service (TOS).

Fourth Switch—Over-the-Air (OTA) Provisioning

The PSP application may also be configured to receive OTA updates to refresh its programming and procedures. For example, the OTA updates may include initial PSP application setup, new listings of authorized parameters, revised methods for sending activity reports, updated switch settings, connectivity with the BTS, handoff between BTSs, bandwidth/frequency control etc.

Terminal Profile Validation

Figure 2:
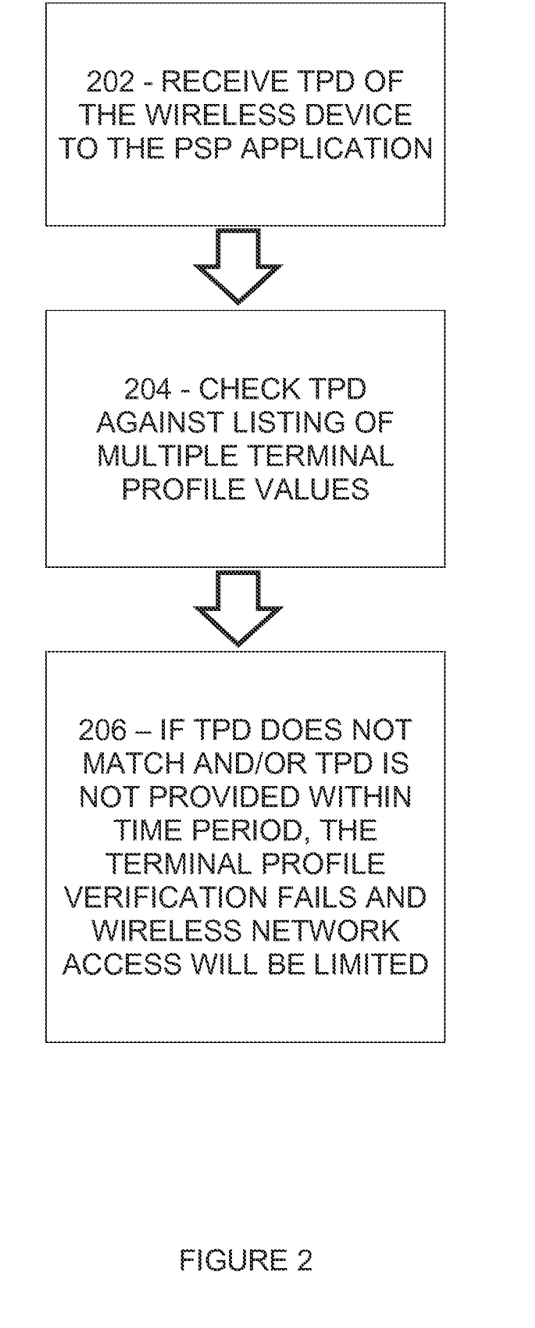
FIG. 2 shows a terminal profile validation process in accordance with aspects of the invention.

FIG. 2 shows a terminal profile validation process in accordance with aspects of the invention. In one or more aspects, a Terminal Profile Validation process may be performed responsive to the first switch and may include one or more of the following processes:

1. The TPD may be received by the wireless device 104 to the PSP application or requested by the PSP application during step 202. Subsequently, the TPD of the wireless device 104 may be checked against a listing of multiple Terminal Profile values during step 204. The listing of multiple Terminal Profile values may be configurable based on a secure non-OTA configuration method and/or an OTA configuration method. The Terminal Profile values may be stored on the SIM 112 and may correspond to authorized wireless devices. In one or more aspects, the listing of multiple Terminal Profile values may be kept in a proprietary and secure file on the SIM 112. The listing may be securely modifiable before/after production of the SIM 112. The listing may take into account any future additions, modifications or deletions of authorized wireless devices. If the TPD does not match one of the values in the listing of multiple Terminal Profile values, then the Terminal Profile Verification fails as shown in step 206.
2. In one or more aspects, either the entire TPD or parts of the TPD of variable length (e.g., up to 32 bytes or an adjustable length) may be checked against the authorized terminal profile listings on the SIM 112 during step 204. Each entry in the Terminal Profile listing may have a length, a value, and/or a mask. The mask may serve the purpose of determining which bits of the Terminal Profile listing must be checked against the entry's value during step 204.
3. At each SIM 112 power cycle, the PSP application may verify that the Terminal Profile value for the wireless device 104 in which the SIM 112 is installed matches at least one entry of the Terminal Profile listing of an authorized wireless device 104 if the Terminal Profile Verification flag is set. If the Terminal Profile Verification flag is set and the wireless device's TPD is not received within a certain period of time, then the Terminal Profile Verification may also fail as shown in step 206.
4. The TPD listing of authorized wireless devices can be provided to a SIM manufacturer to be included on the SIM 112 at the time of card personalization and the TPD listing of authorized wireless devices can be updated via a secure non-OTA programming method or an OTA programming method.

Wireless Device Acceptance/Rejection

In one or more aspects, at each SIM 112 power cycle, the PSP application may accept the wireless device 104 if all required wireless device verifications are successful (e.g., the device TPD or other verifications). Otherwise, the PSP may limit the capabilities of the wireless device 104 in which the SIM 112 has been installed as shown in step 206.

In one or more aspects, the valid IMSI value must be present by default in the elementary file of the IMSI (EF IMSI) in the SIM 112 at production of the SIM card. If the PSP application rejects the wireless device 104 and/or the elementary file of the IMSI (EF IMSI) or the SIM 112 already contains an invalid value, the PSP application may display an error message, such as "Handset rejected. Insert SIM in proper handset." In one or more aspects, the PSP application may restore the original, valid IMSI in the elementary file of the IMSI if the application accepts the wireless device 104 and EF-IMSI had contained an invalid IMSI value.

In a specific GSM implementation of the invention, the following procedures may be performed when dealing with an IMSI value. When setting a valid IMSI, the PSP application may perform the following operations in this order:

Reset the elementary files of: EF-FPLMN, EF-LOCI and EF-LOCIGPRS (EF_PSLOCI in 2G & 3G).

Refresh the wireless device using the Full File Change Notification and SIM Init option. The PSP application may display a message, such as "Please power cycle the handset," if the Refresh operation returns an error while in an accepted wireless device.

In one or more aspects, the PSP application may store an invalid IMSI in EF-IMSI if the PSP application rejects the wireless device and EF-IMSI contains a valid IMSI value. When setting an invalid IMSI, in one or more aspects, the PSP application may perform the following operations in this order:

Reset the elementary files of: EF-FPLMN, EF-LOCI and EF-LOCIGPRS (EF_PSLOCI in 2G & 3G).

Refresh using the Reset option. The PSP application may retry a Refresh on a subsequent Status if Refresh returns a temporary error code while in a rejected wireless device.

Resetting the elementary files of: EF-FPLMN, EF-LOCI, and EF-LOCIGPRS (EF_PSLOCI in 2G & 3G) may ensure that the handset is not confused by the information stored in those files when using a different IMSI.

IMEI Locking (Second Switch)

Figure 3:
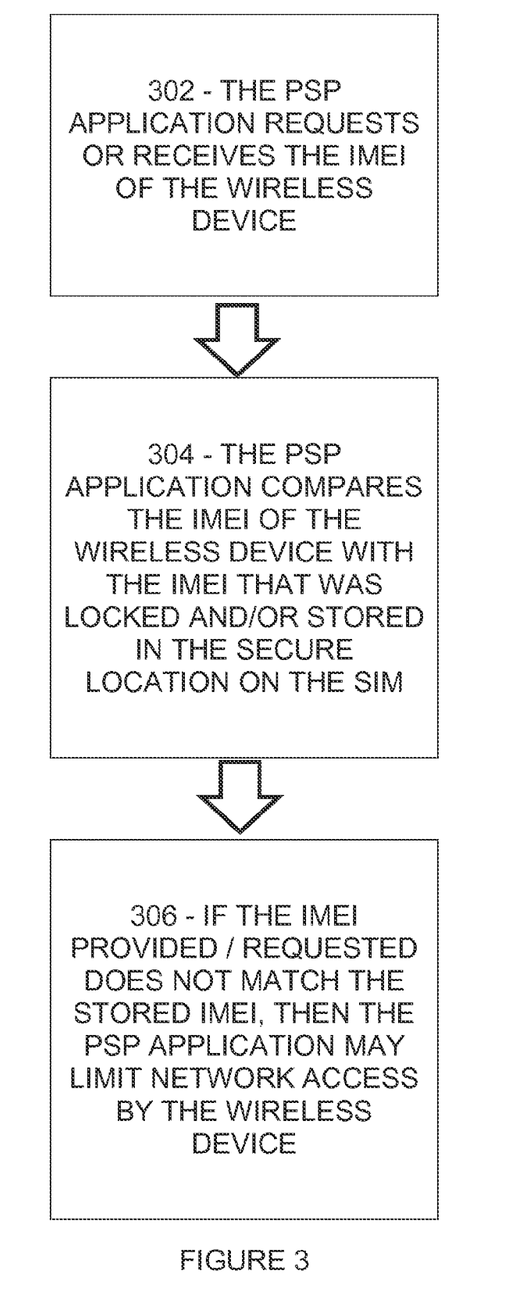
FIG. 3 shows a wireless identification validation process in accordance with aspects of the invention.

FIG. 3 shows a wireless identification validation process in accordance with aspects of the invention. In one or more aspects, an IMEI locking procedure may be performed by the second switch of the PSP application. This procedure may include marrying or pairing the SIM 112 to the current IMEI of the wireless device 104 that is being used. The IMEI of the wireless device 104 to which the SIM 112 may be locked to may be stored in a secure location on the SIM 112. The location of the IMEI of the wireless device 104 on the SIM 112 may be updated or cleared based on a secure non-OTA programming method and/or updated or cleared based on an OTA programming configuration method.

At each subsequent power-up of the wireless device 104, the PSP application may accept the wireless device 104 if all required wireless device verifications are successful. In particular, the PSP application may conduct IMEI verification when the second switch has been activated. In this regard, the PSP application may request or receive the IMEI of the wireless device as shown in step 302. The PSP application may then compare the IMEI of the wireless device with the IMEI that was locked and/or stored in the secure location on the SIM 112 as shown in step 304. If the IMEI provided/requested does not match the stored IMEI, then the PSP application may limit network access by the wireless device 104 in which the SIM card has been installed as shown in step 306.

SIM Reporting Activities

In one or more aspects, the third switch of the PSP application may be configured to send activity reports, such as by SMS messages or the like, to a backend server, system, or component controlled by the MVNO, wireless carrier, or the like for additional validation or monitoring by the backend server, system, or component.

The PSP application may report any one or more of the current Terminal Profile Data (TPD), last accepted (previous) IMEI, the current IMEI, a UICC ICC-ID along with other possible parameters via the SMS messages to the backend server, system, or component. The reporting activity may be transparent to the end user. The listing of parameters that may be reported may be stored securely on the SIM 112.

In one or more aspects, for such SMS reporting messages, the PSP application may be configured to possess a destination address for the messages and a detail format (e.g., as provided by the MVNO or carrier) of the messages. In one aspect, the wireless device 104 change SMS fields may be coded as a clear text ASCII comma separated value. In one or more aspects, the PSP application may use a secure nonvolatile variable called Last Accepted IMEI, where the Last Accepted IMEI is initially blank when the SIM card is manufactured.

Upon request, SMS reporting parameters, including the destination address and other parameters, can be modified at the time of SIM card 112 personalization via a secure non-OTA programming method and they can be updated via OTA programming or non-OTA programming procedures.

In one or more aspects, the PSP application may send a SMS reporting message whenever there is an IMEI change detected and the wireless device 104 obtains network service (including reporting of the originally-installed wireless device 104). This may be checked via the execution of various commands including the PLI (LOCI) command (the execution of which indicates the wireless device currently has normal service on a valid public land mobile network (PLMN) (different than 000000 or FFFFFF)) and if the PLI (LOCI) command is not supported the PSP application may still attempt to send a SMS reporting message.

In one or more aspects, all of the following conditions should be met before sending of a SMS reporting message:
1. Reporting SMS switch (i.e., third switch) is enabled for sending SMS messages.
2. Wireless device is accepted, i.e. passes TPD validation if enabled and/or device IMEI verification if enabled.
3. An IMEI change is detected (including original installation).
4. The wireless device reports not supporting the PLI (LOCI) command in its Terminal Profile and 10 Status command has been received since power-up OR if the wireless device reports supporting the PLI (LOCI) command, the execution of the command indicates the wireless device currently has normal service on a valid PLMN (different than 000000 or FFFFFF).

If all of the SMS reporting conditions are met, except the last (fourth) condition, the PSP application may retry the PLI (LOCI) command if supported by the wireless device at each subsequent Status command should all conditions be finally met. When all the conditions are met, the PSP application may attempt to send a wireless device change reporting SMS.

In one or more aspects, if the sending of the wireless device change reporting SMS fails, the PSP application may retry to send the wireless device Change reporting SMS only on the next SIM power cycle.

In one or more aspects, the PSP application may update the Last Accepted IMEI with the wireless device's current IMEI, if one of the following conditions is met:
The wireless device 104 reports that Device Change SMS has been successfully sent, or
A certain number of reporting SMS message attempts have failed (e.g., 3 attempts).

In one or more aspects, the reporting SMS message may be sent with the following information: the current TPD (such as its entire value up to 32 bytes, up to 64 hexadecimal digits), the Last Accepted IMEI (e.g., 16 decimal digits), the Current IMEI (e.g., 16 decimal digits), and the UICC ICC-ID (e.g., 20 decimal digits).

OTA Provisioning

The PSP application can also be configured to self-initiate a request for OTA programming updates to refresh its programming and procedures as necessary based on backend rules and procedures (e.g., initial PSP application setup, new listings of authorized parameters, revised methods for sending activity reports, updated switch settings, etc.). The OTA Provisioning switch may work independently of standard OTA platform functionality for the wireless device 104 and SIM 112. For example, standard wireless carrier based OTA updates or standard backend initiated OTA updates to PSP application, may work independent of and regardless of OTA Provisioning switch status.

SIM Variants

In one or more aspects, the PSP application may include any combination of the secure switches described in various aspects described herein or otherwise, which may be activated at any given time, which may include only a portion of these secure switches or which may include even further switches for validation and/or reporting. In one or more aspects, several exemplary variations of the SIM 112 configuration and logic are possible, for example, as represented in Table I shown in FIG. 4.

Figure 4:
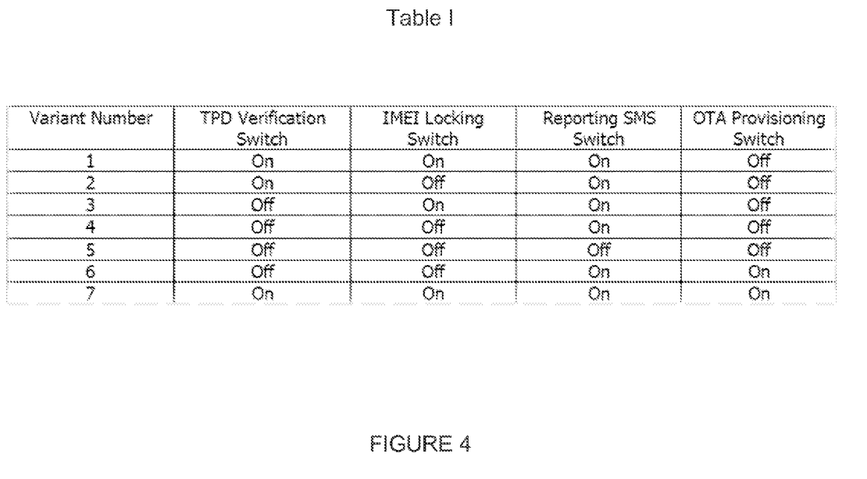
FIG. 4 shows Table I that includes exemplary variations of a configuration and logic possible in accordance with aspects of the invention.

For UICC configuration Variant 1 in Table I shown in FIG. 4, if a wireless device 104 passes the terminal profile validation test of the first switch, only then may the SIM 112 be paired or married to that specific wireless device's IMEI which would then be stored securely in the SIM 112. Once a SIM 112 has been successfully paired or married to a wireless device 104 with a valid IMEI stored on the SIM 112, then the IMEI lock, i.e. verifying that the SIM 112 is being placed into the wireless device 104 with correct corresponding IMEI, may take precedence and the PSP application may skip TPD verification for subsequent SIM 112 power-ups. This should be done without turning off TPD verification switch so that, for example, if the IMEI stored on the UICC is possibly cleared in the future (e.g., via OTA) then the PSP application may resort to TPD verification described above.

For SIM 112 configuration Variant 2 in Table I shown in FIG. 4, the IMEI Locking switch may be disabled such that the PSP application relies on the TPD Verification and Reporting SMS switches for wireless device verification.

For SIM 112 configuration Variant 3 in Table I shown in FIG. 4, the TPD Verification switch may be turned off and the PSP application may give precedence to the IMEI Locking switch, which locks the SIM 112 to the first wireless device 104 IMEI that the PSP application encounters upon power-up.

For SIM 112 configuration Variant 4 in Table I shown in FIG. 4, the TPD Verification and IMEI Locking switches are turned off, where the PSP application relies solely on the Reporting SMS switch for wireless device 104 verification, such that the condition #2 for sending a Reporting SMS would be ignored (i.e., the conditions for acceptance of the wireless device by passing TPD validation if enabled and/or device IMEI verification if enabled would be ignored).

For SIM 112 configuration Variant 5 in Table I shown in FIG. 4, since all switches are set to OFF, the SIM 112 may behave in a standard manner similar to a post-paid SIM.

For SIM 112 configuration Variant 6 in Table I shown in FIG. 4, when the OTA Provisioning switch is set to ON, then this may trigger the PSP application to initiate OTA provisioning via a TPD (Terminal Profile Data) update request to the OTA platform. The OTA platform may handle the TPD update request based on backend rules and communicate appropriate updates as necessary. Once the PSP application receives the necessary OTA updates, it may subsequently send a Proof of receipt to the OTA platform confirming the update was successful. The initial state of the PSP application for OTA Provisioning may include the following configuration:

The OTA Provisioning switch may be set to ON, the TPD Verification and IMEI Locking switches may be set to OFF, while the Reporting SMS switch may remain ON; and SMS Service may be activated. (e.g., the GSM line may be fully provisioned before OTA provisioning request or other SMS message is sent to OTA platform or SMSC).

The workflow of the OTA Provisioning switch may include:

When wireless device 104 is powered up, the PSP application may send the current TPD, IMEI and UICC ICC-ID as part of wireless device change reporting for backend records. In addition, the PSP application may request that the OTA platform update the TPD listing of authorized wireless devices. The PSP application may continue to retry sending out the OTA request(s) until it receives appropriate OTA response(s).

The PSP application may display a message on the wireless device 104, such as "Activation in Progress," during this process for the end user.

The OTA platform may then push the necessary responses such as but not limited to setting the TPD verification and IMEI Locking switches ON as well as pushing the most current TPD(s), if needed, for updating the TPD listing of authorized wireless devices.

A refresh command may be sent upon backend discretion. For example, if the backend determines from available data that the UICC is in a legitimate wireless device, then it may not send a refresh command to avoid possible customer impact.

If a refresh command is sent due to the backend determining the UICC is in an unintended wireless device or for any reason such as the backend logic not being implemented, then upon encountering a full refresh (reset) command the PSP application may attempt to display a warning message to the end user before committing the refresh (i.e., "The phone may be rebooting shortly"). The PSP Application may then reboot the wireless device and complete the TPD verification and IMEI pairing operations associated with their respective switches described herein.

Upon accepting the OTA responses, the PSP application may send a POR (proof of receipt) to the OTA platform as well as remove any activation prompts being displayed for the end user.

Complete account activation (e.g., SMS+voice+data) may be completed by the account provider (e.g., MVNO or carrier), if not already done.

In one or more aspects, on wireless devices that are verified or accepted, the following Card Application Toolkit (CAT) commands (otherwise known as STK or SIM Toolkit commands or other similar commands) should be provided, where additional CAT support may be required as needed:

Terminal Profile—this command is mandatory to accept a device.

Refresh (Full File Change Notification and SIMInit)—if not supported, the user would be required to manually power cycle the handset when swapping the UICC from a rejected handset to an accepted handset.

PLI (IMEI)—if not supported, the device change notification reporting SMS may miss some information.

PLI (MCC, MNC, LAC and Cell ID)—if not supported, the applet may assume there is coverage after 10 Status command has been received.

Send SMS—if not supported, the device change notification SMS cannot be sent.

Display Text (high priority, user defined)—if not supported, the user may not be informed to power cycle the handset if Refresh is not supported as well.

In one or more aspects, on wireless devices that are rejected, the following CAT support should be provided, where additional CAT support may be required as needed:

Refresh (Reset)—if not supported, the device would still be usable until the next power cycle.

Display Text (high priority, user defined)—if not supported, the user may not be informed that the device is not supported.

In one or more aspects, for an identical use case and PSP application configuration, the user experience may vary depend on the wireless device 104, on the wireless network and possibly on the U ICC profile.

In one or more aspects, the PSP application installed on and operating on the UICC (i.e., SIM card) and its associated functionality described herein may be implemented in software, stored on a computer readable medium or computer readable storage medium, such as a memory of the UICC, where the memory may store computer readable instructions, e.g., program code, that can be executed by a processor or controller in a device (e.g., on the UICC or mobile device) to carry out one or more of the techniques described herein. Additionally, it should be noted that if needed, the invention and/or PSP application may also use other areas of memory to implement the invention including memory in the wireless device, network based memory, or the like.

As described above, the invention provides a Mobile Virtual Network Operator the ability to provide subscribers with greater choice of services and devices. Moreover, the invention allows the Mobile Virtual Network Operator the ability to limit the choice of services and devices.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A process of authorizing a wireless device comprising:
   executing a pairing application comprising a plurality of switches, the plurality of switches being associated with at least a terminal profile validation process, an IMEI (International Mobile Equipment Identity) Locking process, an OTA (Over The Air) provisioning process, and a SMS (Short Message Service) reporting process;
   storing a list of authorized terminals within a memory accessible by a wireless device;
   comparing the list of authorized terminals in the memory to at least one of terminal profile data and an IMEI of the wireless device with the pairing application; and
   allowing network access if at least one of the terminal profile data and the IMEI are found on the list of authorized terminals and limiting network access if the terminal profile data and the IMEI are not found on the list of authorized terminals.

2. The process of authorizing a wireless device according to claim 1 wherein the memory comprises a removable memory associated with the wireless device.

3. The process of authorizing a wireless device according to claim 2 wherein the removable memory comprises at least one of a Subscriber Identity Module (SIM) and Universal Integrated Circuit Card (UICC).

4. The process of authorizing a wireless device according to claim 1 wherein the list of authorized terminals comprises at least one of a previously stored International Mobile Equipment Identity (IMEI) and a listing of authorized terminal profile data values.

5. The process of authorizing a wireless device according to claim 1 further comprising sending a report comprising at least one of a current Terminal Profile Data, last accepted International Mobile Equipment Identity (IMEI), a current IMEI, and an Universal Integrated Circuit Card (UICC) Integrated Circuit Card ID (ICC-ID) to a backend server.

6. The process of authorizing a wireless device according to claim 2 further comprising storing securely in the removable memory at least one of a current Terminal Profile Data, last accepted International Mobile Equipment Identity (IMEI), a current IMEI, and an UICC Integrated Circuit Card ID (ICC-ID).

7. The process of authorizing a wireless device according to claim 1 further comprising at least one of provisioning and updating Over The Air (OTA) at least one of the plurality of switches of the pairing application and the list of authorized terminals.

8. The process of authorizing a wireless device according to claim 1 wherein the network comprises at least one of a Global System for Mobile Communication (GSM) network and a UMTS/LTE telecommunication network.

9. A process of functioning in at least one of a Global System for Mobile Communication (GSM) network and a UMTS/LTE telecommunication network as a Mobile Virtual Network Operator (MVNO) comprising using the process of authorizing a wireless device according to claim 1.

10. A wireless device configured to control network authorization comprising:
    a removable memory storing a list of authorized terminals within the wireless device;
    a processor configured to execute a pairing application comprising a plurality of switches, the plurality of switches being associated with at least a terminal profile validation process, an IMEI (International Mobile Equipment Identity) locking process, an OTA (Over The Air) provisioning process, and a SMS (Short Message Service) reporting process;
    a comparator to compare the list of authorized terminals in the removable memory to at least one of terminal profile data and an IMEI of the wireless device; and
    the wireless device being configured to allow network access if at least one the terminal profile data and the IMEI of the wireless device is found on the list of authorized terminals and the wireless device being further configured to limit network access if the terminal profile data and the IMEI of the wireless device are is not found on the list of authorized terminals.

11. The wireless device according to claim 10 wherein the removable memory comprises at least one of a Subscriber Identity Module (SIM) and Universal Integrated Circuit Card (UICC).

12. The wireless device according to claim 10 wherein the list of authorized terminals comprises at least one of a previously stored International Mobile Equipment Identity (IMEI) and a listing of authorized terminal profiles.

13. The wireless device according to claim 10 wherein the wireless device is configured to send a report comprising at least one of the current Terminal Profile Data, last accepted International Mobile Equipment Identity (IMEI), the current IMEI, and an Universal Integrated Circuit Card (UICC) Integrated Circuit Card ID (ICC-ID) to a backend server.

14. The wireless device according to claim 10 further comprising storing securely in the memory at least one of the current Terminal Profile Data, last accepted International Mobile Equipment Identity (IMEI), the current IMEI, and a Universal Integrated Circuit Card (UICC) Integrated Circuit Card ID (ICC-ID).

15. The wireless device according to claim 10 wherein the wireless device is configured to provision the pairing application using one of an Over The Air (OTA) process and a non-OTA process.

16. The process of authorizing a wireless device according to claim 1 wherein one of the plurality of switches is associated with the terminal profile validation process, the terminal profile validation process comparing identifying information to the listing of authorized terminals.

17. The process of authorizing a wireless device according to claim 1 wherein one of the plurality of switches is associated with the SMS reporting process, the SMS reporting process sending activity reports to at least one of a backend server, a system, a component controlled by a MVNO and a component controlled by a wireless carrier.

18. The wireless device according to claim 10 wherein one of the plurality of switches is associated with the terminal profile validation process, the processor being configured to implement the terminal profile validation process to compare identifying information to the listing of authorized terminals.

19. The wireless device according to claim 10 wherein one of the plurality of switches is associated with the SMS reporting process, the processor being configured to implement the SMS reporting process to send activity reports to at least one of a backend server, a system, a component controlled by a MVNO and a component controlled by a wireless carrier.

20. The wireless device according to claim 10 wherein one of the plurality
of switches is associated with the OT A provisioning process, the processor being configured to implement the OT A provisioning process to allow OT A updates to refresh programming and procedures including at least one of an initial application setup, new listings of authorized parameters, revised methods for sending activity reports, updated switch settings, and connectivity with a network.

\* \* \* \* \*